(12) United States Patent
Mueller

(10) Patent No.: US 8,845,487 B2
(45) Date of Patent: Sep. 30, 2014

(54) CONTROL FOR A VARIABLE TENSIONING DEVICE FOR A RIBBEDV-BELT OF A MOTOR VEHICLE DRIVE

(75) Inventor: Torsten Mueller, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 13/228,761

(22) Filed: Sep. 9, 2011

(65) Prior Publication Data

US 2012/0065009 A1    Mar. 15, 2012

(30) Foreign Application Priority Data

Sep. 9, 2010    (DE) .......................... 10 2010 044 864

(51) Int. Cl.
*F16H 61/662* (2006.01)
*F16H 7/12* (2006.01)
*F02B 67/06* (2006.01)
*F16H 7/08* (2006.01)

(52) U.S. Cl.
CPC ......... *F02B 67/06* (2013.01); *F16H 2007/0085* (2013.01); *F16H 2007/0823* (2013.01); *F16H 7/1263* (2013.01)
USPC .......................................................... 477/44

(58) Field of Classification Search
USPC ......... 474/113, 117, 118, 138, 106, 109, 110, 474/112, 123, 135, 136; 477/44, 37, 34
See application file for complete search history.

(56) References Cited

U.S. PATENT DOCUMENTS

| | | | | |
|---|---|---|---|---|
| 4,077,272 A * | 3/1978 | Busso | ........................... | 474/110 |
| 4,478,595 A | 10/1984 | Hayakawa et al. | | |
| 5,733,214 A | 3/1998 | Shiki et al. | | |
| 6,953,407 B2 * | 10/2005 | Kitamura et al. | ............. | 474/135 |
| 8,069,737 B2 * | 12/2011 | Hanoun | ................... | 73/862.474 |
| 2006/0178240 A1* | 8/2006 | Hansel | ........................... | 474/135 |
| 2013/0172137 A1* | 7/2013 | Antchak et al. | ............... | 474/133 |

FOREIGN PATENT DOCUMENTS

| | | |
|---|---|---|
| DE | 4334148 A1 | 4/1994 |
| DE | 19919594 A1 | 11/2000 |
| DE | 10153329 A1 | 6/2002 |
| DE | 10159072 A1 | 6/2003 |
| DE | 10225268 A1 | 12/2003 |
| DE | 10232328 A1 | 4/2004 |
| DE | 102004016353 A1 | 10/2005 |
| DE | 102008021257 A1 | 11/2009 |
| GB | 2383394 B | 9/2005 |

* cited by examiner

*Primary Examiner* — Saul Rodriguez
*Assistant Examiner* — David J Hlavka
(74) *Attorney, Agent, or Firm* — Ingrassia Fisher & Lorenz, P.C.

(57) ABSTRACT

A tensioning device is provided for a ribbed V-belt of a motor vehicle with at least one tensioning pulley that is directly and functionally connected to the ribbed V-belt and with a controller designed for varying the position and/or configuration of the tensioning pulley in dependence on the instantaneous operating state of at least one belt pulley on a driven side and/or a driving side that is connected to the ribbed V-belt in order to operationally adapt the tension of the ribbed V-belt.

13 Claims, 2 Drawing Sheets

CONTROL FOR A VARIABLE TENSIONING DEVICE FOR A RIBBEDV-BELT OF A MOTOR VEHICLE DRIVE

CROSS-REFERENCE TO RELATED APPLICATION

This application claims priority to German Patent Application No. 102010044864.8, filed Sep. 9, 2010, which is incorporated herein by reference in its entirety.

TECHNICAL FIELD

The technical field pertains to a tensioning device for a ribbed V-belt of a motor vehicle engine, as well as to a corresponding method and a computer program product for tensioning a ribbed V-belt.

BACKGROUND

Ribbed V-belts are also referred to as Poly-V-belts and widely used for realizing a belt drive in motor vehicles, particularly for driving ancillary units or auxiliary equipment. Belt drives of this type make it possible to drive auxiliary equipment or ancillary units such as a cooling pump, an air-conditioning compressor, a generator, a power steering pump and the like by means of the main unit such as, e.g., the driving side of the crankshaft of an engine. V-belts, ripped V-belts or Poly-V-belts frequently are statically tensioned or may feature automatic tensioning systems, in particular, in order to observe a largely constant belt tension.

In conventional belt drives, the belt tension is realized such that a sufficiently reliable torque transmission between the pulleys on the driven side and the driving side of the belt can be ensured for all conceivable operating states of the belt drive. Auxiliary equipment that can be deactivated or variably activated such as, for example, the air-conditioning compressor of an air-conditioning system result in an at least brief peak load at the time of their activation in the belt drive.

Furthermore, rotational irregularities, i.e., deviations from an average angular velocity of a crankshaft on the driven side, can occur, in particular, in the low-speed range of an internal combustion engine. Such peak loads or rotational irregularities only occur relatively rarely and for brief periods of time, but require a comparatively high belt tension. In order to also take into account such boundary states and to ensure a sufficient torque transmission when an air-conditioning compressor is activated or rotational irregularities occur, the tension of the ribbed V-belt needs to be standardly defined for this boundary situation and permanently adjusted to a comparatively high tension level.

The thus far conventional, comparatively high tension of a Poly-V-belt or a ribbed V-belt is associated with increased friction losses, as well as a relatively high mechanical load on the bearings of participating pulleys. This not only results in an increased fuel consumption, but also a reduced service life of the ribbed V-belt or the pulleys and the corresponding bearings of the ancillary units that are functionally connected to the ribbed V-belt.

In this respect, at least one aim is to make available an improved tensioning device for a ribbed V-belt of a motor vehicle that makes it possible to extend the service life of the ribbed V-belt, as well as to reduce the mechanical load on the participating pulleys and their bearings. At least another aim is lowering the fuel consumption of an internal combustion engine. In addition, it should be possible to easily realize the tensioning device with respect to its construction and manufacturing technology. In addition, other aims, desirable features and characteristics will become apparent from the subsequent summary and detailed description, and the appended claims, taken in conjunction with the accompanying drawings and this background.

SUMMARY

A tensioning device is designed for a ribbed V-belt or Poly-V-belt drive of a motor vehicle. It features at least one tensioning pulley that is directly and functionally connected to the ribbed V-belt and equipped with control means that are designed for varying the position and/or configuration of the tensioning pulley in dependence on an instantaneous operating state of at least one belt pulley on the driving side and/or the driven side that is connected to the ribbed V-belt. In this way, the tension of the ribbed V-belt can be variably adapted in dependence on the currently prevailing operating state and adjusted to an optimal tension for the respective operating state.

For example, it would be possible, in particular, to reduce the basic tension of the ribbed V-belt in comparison with conventional tensioning devices, e.g., in order to reduce frictional losses during the operation of the belt drive and therefore the fuel consumption of the vehicle engine. In addition to reduced frictional losses, it is also advantageous that the forces acting upon the bearings of the participating pulleys in the radial direction can be reduced by reducing the basic tension of the ribbed V-belt.

Due to the variable and operational adaptation of the ribbed V-belt tension to the respective instantaneous operating state of the belt drive, its associated pulleys and the main or ancillary units functionally connected thereto, the tension of the ribbed V-belt can, if so required, be increased in order to provide a sufficiently high belt tension for avoiding slippage or other malfunctions, e.g., at the onset of a peak load. In this respect, it is proposed, in particular, that the belt tension essentially is temporarily increased to a predefined or variably adaptable degree for the duration of an operating state critical to the belt drive only.

According to a first embodiment, a bearing axis of the tensioning pulley, over which the ribbed V-belt extends, can be adjusted with respect to its position and/or with respect to its alignment during the operation of a motor vehicle engine in order to variably adapt the ribbed V-belt tension. Accordingly, it would be possible to vary the position and/or alignment of the tensioning pulley in a translatory or pivotable fashion such that the ribbed V-belt extending over the tensioning pulley is subjected to a correspondingly increased or decreased tension.

In another embodiment thereof, it is furthermore proposed that the bearing axis of the tensioning pulley can be displaced and/or pivoted by means of an electric or pneumatic actuator. The position of the bearing axis advantageously can be varied in the radial direction. The actuator or actuators may furthermore cooperate with one or more energy storing devices such as, e.g., springs or pneumatic springs in order to realize a positional adjustment of the bearing axis of the tensioning pulley.

According to another embodiment, it is furthermore proposed that the control means are designed for at least temporarily increasing the tension of the ribbed V-belt by correspondingly adjusting the tensioning pulley at a low speed of the engine and/or when a rotational irregularity that lies above a predefined threshold occurs on the driving side. Rotational irregularities of an internal combustion engine typically occur in the low speed range. Fluctuations in the angular velocity, e.g., of the crankshaft are by nature associated with corresponding accelerations and decelerations of the crankshaft. In order to also transmit such rotational irregularities to the belt drive and the belt pulleys functionally connected thereto in a largely slip-free fashion, the tension of the ribbed V-belt needs to be increased, e.g., by a predefined degree within a correspondingly predefined speed range or as a consequence of a measurable deviation from an average angular velocity of the crankshaft that exceeds a predefined threshold value.

According to another embodiment, it is furthermore proposed that the control means are designed for already at least temporarily increasing the tension of the ribbed V-belt in preparation of and/or in the presence of an increased or increasing load on the driven side of the ribbed V-belt. Such a situation occurs, in particular, when an air-conditioning system is switched on or the air-conditioning compressor is activated in the ribbed V-belt drive. In order to prevent any slippage or similar malfunction for any inevitably occurring peak load of the ribbed V-belt, the tension of the ribbed V-belt is, according to the invention, already increased prior to the coupling of the pulley of the air-conditioning compressor into the belt drive. In this case, it would be conceivable, in particular, to couple the air-conditioning compressor into the belt drive with a certain time delay referred to an activation of the air-conditioning system initiated by a user. As soon as the air-conditioning compressor is coupled into the belt drive and driven in a largely regular fashion by the ribbed V-belt, the tension of the ribbed V-belt can be once again advantageously lowered to the original basic tension.

According to another embodiment, it is therefore furthermore proposed that the control means are designed for once again lowering the tension of the ribbed V-belt to a predefined degree as a consequence of a reducing rotational irregularity on the driving side and/or as a consequence of a reducing load on the driven side.

According to an additional embodiment, it would furthermore be possible for the control means to automatically determine the degree of an adjustment or variation of the configuration of the tensioning pulley in dependence on measurable operating state parameters of at least one belt pulley. In this respect, the intensity of the ribbed V-belt tension can be variably and optimally adapted to the respectively prevailing operating state of the belt drive.

According to another embodiment, the control means may furthermore measure the angular velocities of several belt pulleys that are directly and functionally connected to one another via the ribbed V-belt and increase or decrease the tension of the ribbed V-belt as a consequence of a measured or incipient deviation of said angular velocities relative to one another until the measurable deviations once again drop below a predefined threshold. In this respect, the control means not only can qualitatively determine and/or iteratively vary the degree of an increase or decrease in the belt tension, but also quantitatively in order to achieve a consumption-optimized tension of the ribbed V-belt.

In an additional embodiment, it is furthermore proposed that the control means can be integrated into an engine control. In this respect, it is particularly advantageous if the vehicle-specific or engine-specific parameters already present in the engine control are used for determining the instantaneous operating state of the belt drive or its ancillary units or auxiliary equipment coupled thereby. In this respect, a separate sensory determination of operating state parameters of the ribbed V-belt or the belt pulleys coupled to one another by the ribbed V-belt can be eliminated.

It would therefore be possible, e.g., to directly integrate the control means into the engine control and therefore into the engine electronics. In this respect, it would merely be required to additionally develop the construction of the tensioning pulley of existing tensioning devices of ribbed V-belt drives in accordance with the invention, particularly to provide the tensioning pulley with an electrically activatable actuator and to couple the tensioning pulley into the engine control. In this case, the control means may be realized in the form of a preferably computer-implemented electric circuit.

A motor vehicle engine arrangement is also provide with an internal combustion engine and a ribbed V-belt, as well as with an above-described tensioning device for variably and temporarily varying the tension of the ribbed V-belt during the operation of the engine. In this respect, the motor vehicle comprises such a motor vehicle engine arrangement or with an inventive tensioning device for variably and, in particular, temporarily adapting the tension of a ribbed V-belt to the respectively prevailing operating parameters of the belt drive.

According to another embodiment, a method is provided for varying the tension of a ribbed V-belt of a motor vehicle. An instantaneous operating state of the at least one belt pulley on a driving side and/or a driven side is determined in a first step. All belt pulleys in question are connected to the ribbed V-belt in a torque-transmitting fashion. The pulleys may fulfill, for example, the function of driving the ribbed V-belt and accordingly be arranged, e.g., on the crankshaft of an internal combustion engine. Other pulleys that mechanically interact with the ribbed V-belt are at least arranged on the driven side of the belt, i.e., they are driven by the revolving ribbed V-belt. Driven belt pulleys may consist, for example, of pulleys for the generator, the power steering pump, the air-conditioning compressor and/or the cooling pump.

In another step, the tension of the ribbed V-belt is operationally adapted in dependence on the determined operating state of the at least one belt pulley by varying the position and/or by varying the configuration of a tensioning pulley that is directly and functionally connected to the ribbed V-belt. In this respect, it is proposed, in particular, to at least temporarily increase the tension of the ribbed V-belt relative to a basic tension in order to sufficiently compensate operating states that are critical to the belt drive, e.g., when a rotational irregularity of the crankshaft occurs or when an air-conditioning compressor is coupled into the belt drive, such that the belt drive also operates reliably under such critical operating states.

In order to operationally adapt or optimize the V-belt tension to the respective situation, the position and, if applicable, also the configuration such as, e.g., the outer circumference of a tensioning pulley, preferably is variably, but only temporarily varied, particularly increased, relative to a basic tension that is comparatively lowered in the prior art in order to increase or decrease the tension of the ribbed V-belt.

In another embodiment thereof, the engine speed and/or a rotational irregularity of at least one shaft driving the ribbed V-belt, preferably the crankshaft, is measured in order to determine the operating state of the belt drive or the pulleys of the main and ancillary units. As a supplement thereto, it would also be possible, according to an additional development, to determine the load on the driven side of the ribbed V-belt in a sensory fashion. For example, a spring-loaded arrangement of the tensioning pulley may be used for this purpose. The load on the driven side and/or the instantaneous tension of the ribbed V-belt can be measured or determined in a sensory fashion based on the excursion of a spring or similar energy storing device.

According to another embodiment, the load on the driven side of the ribbed V-belt can be determined based on the number of ancillary units driven by means of the ribbed V-belt and/or based on the instantaneous configuration. In this case, it may already suffice to estimate the load on the driven side based on the number of activated ancillary units only in order to realize an inventive adaptation of the ribbed V-belt tension. It would therefore be possible, e.g., to increase the ribbed V-belt tension from its basic tension by a predefined amount over a predefined time interval when an air-conditioning system is switched on, wherein the length of the time interval typically is longer than the duration required for coupling the air-conditioning compressor into the ribbed V-belt drive.

According to another embodiment, a computer program product is provided for operationally adapting the tension of a ribbed V-belt of a motor vehicle that is equipped with program means for determining an instantaneous operating state of at least one belt pulley on the driven side and/or the driving side that is connected to the ribbed V-belt, as well as program means for operationally adapting the ribbed V-belt tension in dependence on the determined operating state. The latter are furthermore designed for varying the position and/or configuration of a tensioning pulley that is directly and functionally connected to the ribbed V-belt.

BRIEF DESCRIPTION OF THE FIGURES

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
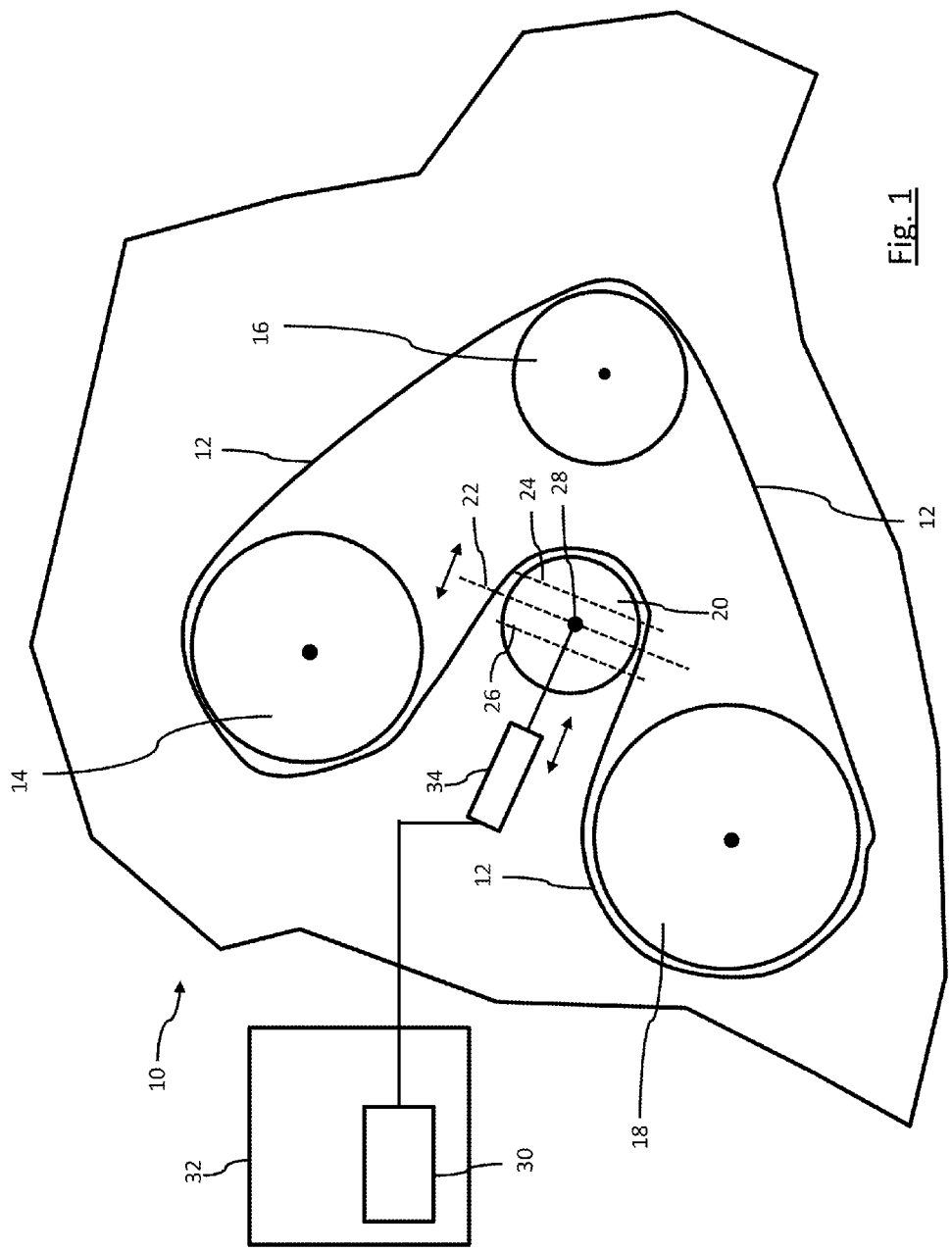
FIG. 1 shows a schematic representation of a ribbed V-belt drive of a motor vehicle engine with an tensioning device in accordance with an embodiment.
Figure 2:
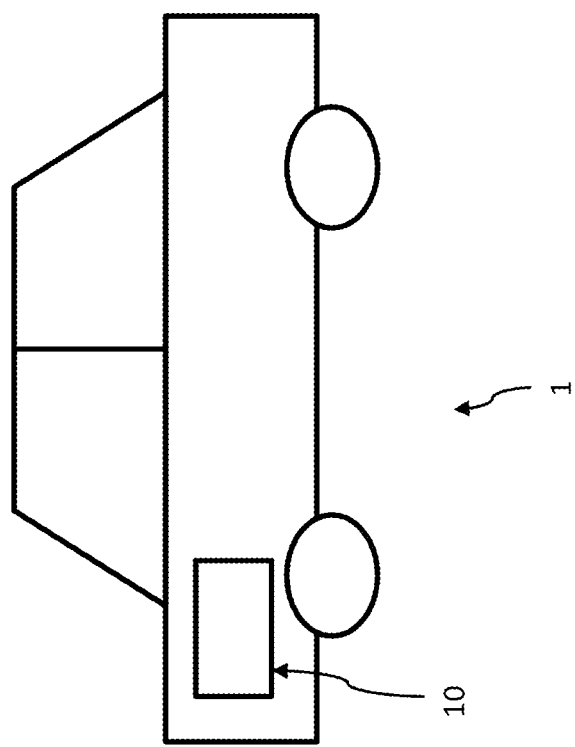
FIG. 2 shows a simplified schematic representation of a motor vehicle with an engine that features a tensioning device illustrated in FIG. 1.

FIG. 2 shows a simplified schematic representation of a motor vehicle in the form of a passenger car (PKW) 1 with an internal combustion engine 10 that is illustrated in greater detail in FIG. 1. FIG. 1 shows a simplified schematic representation of a ribbed V-belt drive of an internal combustion engine 10, the crankshaft of which is provided with a belt pulley 18 on the driven side. Other auxiliary equipment and ancillary units that are not illustrated in greater detail are provided on the motor vehicle engine arrangement 10 illustrated in FIG. 1. The belt pulley 16 is assigned, e.g., to a generator and the belt pulley 14 is assigned to a cooling pump.

All belt pulleys 14, 16, 18 illustrated in FIG. 1 are coupled to one another by means of a closed, revolving ribbed V-belt 12. When the engine is running such that the belt pulley 18 rotates, the ancillary units or auxiliary equipment such as, for example, a generator or cooling pump are driven permanently or, e.g., an air-conditioning compressor is driven temporarily.

The belt drive shown furthermore features a tensioning pulley 20, the rotational or bearing axis 28 of which can be displaced in situ during the operation of the engine. In FIG. 1, different possible adjustments and positions of the tensioning pulley 20 are indicated with broken lines 22, 24, 26. The tension of the ribbed V-belt 12 can be increased by displacing the tensioning pulley 20 into a position indicated with the line 24 by means of an actuator 34, as well as decreased by correspondingly displacing the tensioning pulley 20 in the opposite direction, e.g., to the line 26.

The position of the tensioning pulley 20 can be variably adjusted, e.g., between the lines 22, 24 and 26, during the operation of the engine 10 with the aid of control means 30 that are not illustrated in greater detail. The ribbed V-belt 12 has, in particular, a comparatively low basic tension and the tensioning pulley 20 is only temporarily displaced or pivoted in order to increase the ribbed V-belt tension in dependence on the respective situation. The ribbed V-belt tension should be temporarily increased, e.g., immediately before or during the coupling of an air-conditioning compressor that is not explicitly illustrated in this figure into the belt drive and/or, e.g., when a rotational irregularity of the crankshaft occurs. The actual control means 30 may in this case be implemented into an engine control 32 in the form of software.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A tensioning device for a ribbed V-belt of a motor vehicle, comprising:
   a tensioning pulley that is directly and functionally connected to the ribbed V-belt; and
   a controller integrated into an engine control, the controller being configured to vary the tensioning pulley in dependence on an instantaneous operating state of a belt pulley on a side that is connected to the ribbed V-belt in order to operationally adapt a tension of the ribbed V-belt.

2. The tensioning device according to claim 1, wherein the controller is configured to vary a position of the tensioning pulley.

3. The tensioning device according to claim 1, wherein the controller is configured to vary a configuration of the tensioning pulley.

4. The tensioning device according to claim 1, wherein the side is a driven side.

5. The tensioning device according to claim 1, wherein the side is a driving side.

6. The tensioning device according to claim 1, further comprising a bearing axis of the tensioning pulley that is adjustable with respect to a position during an operation of a motor vehicle engine.

7. The tensioning device according to claim 6, wherein the bearing axis of the tensioning pulley is movable with an actuator.

8. The tensioning device according to claim 1, wherein the controller is configured to increase the tension of the ribbed V-belt at a low speed of an engine.

9. A tensioning device for a ribbed V-belt of a motor vehicle, comprising:
   a tensioning pulley that is directly and functionally connected to the ribbed V-belt; and
   a controller configured to vary the tensioning pulley in dependence on an instantaneous operating state of a belt pulley on a side that is connected to the ribbed V-belt in order to operationally adapt a tension of the ribbed V-belt, wherein the controller is configured to increase the tension of the ribbed V-belt when a rotational irregularity that lies above a predefined threshold value occurs.

10. The tensioning device according to claim 4, wherein the controller is configured to increase the tension of the ribbed V-belt upon detection of an increased load on the driven side of the ribbed V-belt.

11. The tensioning device according to claim 10, wherein the controller is configured to lower the tension of the ribbed V-belt to a predefined degree as a consequence of a reducing rotational irregularity on the driving side.

12. A tensioning device for a ribbed V-belt of a motor vehicle, comprising:
- a tensioning pulley that is directly and functionally connected to the ribbed V-belt; and
- a controller configured to vary the tensioning pulley in dependence on an instantaneous operating state of a belt pulley on a side that is connected to the ribbed V-belt in order to operationally adapt a tension of the ribbed V-belt, wherein the controller is configured to determine a degree of an adjustment of a configuration of the tensioning pulley in dependence on measurable operating state parameters of the belt pulley.

13. The tensioning device according to claim 12, wherein the controller is integrated into an engine control.

\* \* \* \* \*